United States Patent
Toya

(10) Patent No.: US 10,243,375 B2
(45) Date of Patent: Mar. 26, 2019

(54) SERVER DEVICE AND POINT MANAGEMENT METHOD

(71) Applicant: Panasonic Intellectual Property Management Co., Ltd., Osaka (JP)

(72) Inventor: Shoichi Toya, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 272 days.

(21) Appl. No.: 15/227,302

(22) Filed: Aug. 3, 2016

(65) Prior Publication Data

US 2017/0063110 A1  Mar. 2, 2017

(30) Foreign Application Priority Data

Aug. 28, 2015 (JP) .................. 2015-169800

(51) Int. Cl.
*H02J 7/00* (2006.01)
*H02J 50/80* (2016.01)

(52) U.S. Cl.
CPC .......... *H02J 7/0021* (2013.01); *H02J 7/0004* (2013.01); *H02J 50/80* (2016.02); *H02J 2007/0001* (2013.01); *Y02T 10/7055* (2013.01)

(58) Field of Classification Search
USPC ........................................................ 320/106
See application file for complete search history.

(56) References Cited

U.S. PATENT DOCUMENTS

| | | | | |
|---|---|---|---|---|
| 6,417,647 B2* | 7/2002 | Kaji | ...................... | G06Q 30/04 320/132 |
| 6,618,644 B2* | 9/2003 | Bean | ........................ | G07F 7/06 700/231 |
| 2003/0034757 A1* | 2/2003 | Woodnorth | ......... | H01M 10/425 320/132 |
| 2014/0368156 A1* | 12/2014 | Aloe | ..................... | H02J 7/0003 320/106 |

FOREIGN PATENT DOCUMENTS

| | | |
|---|---|---|
| JP | 2003-288539 | 10/2003 |
| JP | 2004-126669 | 4/2004 |
| JP | 2011-118638 | 6/2011 |
| JP | 2013-232129 | 11/2013 |

* cited by examiner

*Primary Examiner* — Robert J Grant
(74) *Attorney, Agent, or Firm* — Greenblum & Bernstein, P.L.C.

(57) ABSTRACT

A server device includes: a storage unit that stores points that a user of the battery pack holds, the points being usable as fees for at least one of usage of the battery pack and enjoyment of a service; and a control unit that changes the points, based on whether or not a usage state satisfies a usage condition, the usage condition including at least one of a condition for state management of the battery pack and a condition for usage promotion of the battery pack.

17 Claims, 6 Drawing Sheets

| MEMBER ID | BATTERY PACK ID | RETURN DUE DATE | RETURN DATE | UPDATE DUE DATE | USAGE AMOUNT |
|---|---|---|---|---|---|
| 00001 | 001001 | 2015/8/15 | | 2015/8/7 | 600 |
| 00002 | 001002 | 2015/7/31 | | 2015/8/9 | 200 |
| 00003 | 001003 | 2015/9/30 | | 2015/8/6 | 5 |
| 00004 | 001004 | 2015/10/1 | | 2015/8/12 | 300 |
| 00005 | 001005 | 2015/10/1 | | 2015/8/12 | 100 |

| MEMBER ID | POINTS | EXPIRATION DATE |
|---|---|---|
| 00001 | 5000 | 2016/1/1 |
| 00002 | 10000 | 2016/1/1 |
| 00003 | 0 | |
| 00004 | 5000 | 2016/1/1 |
| 00005 | 3000 | 2016/1/1 |

SERVER DEVICE AND POINT MANAGEMENT METHOD

BACKGROUND

1. Technical Field

The present disclosure relates to a server device and point management method to manage points which are usable as fees for at least one of usage of the battery pack.

2. Description of the Related Art

Battery packs have been used heretofore to supply electric power to electric bicycles, electric scooters, electric automobiles, and so forth. There has been proposed a rental service to rent battery packs to users. Japanese Unexamined Patent Application Publication No. 2003-288539 discloses a battery pack billing system where the user is billed in accordance with the usage state of the rental battery pack.

However, there have been cases in the related art where rented battery packs are not used appropriately. Effectively providing the battery pack rental service becomes difficult if the battery packs are not appropriately used.

SUMMARY

One non-limiting and exemplary embodiment provides a server device and point management method where inappropriate use of battery packs can be suppressed.

In one general aspect, the techniques disclosed here feature a server device including: a storage unit that stores points that a user of the battery pack holds, the points being usable as fees for at least one of usage of the battery pack and enjoyment of a service; and a control unit that changes the points, based on whether or not a usage state satisfies the usage condition, the usage condition including at least one of a condition for state management of the battery pack and a condition for usage promotion of the battery pack.

The server device and point management method according to an aspect of the present disclosure can suppress inappropriate use of battery packs.

It should be noted that general or specific embodiments may be implemented as a system, a method, an integrated circuit, a computer program, a storage medium such as a computer-readable CD-ROM or the like, or any selective combination a system, a method, an integrated circuit, a computer program, and a storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of a first management table according to an embodiment;

FIG. 5 is a diagram illustrating an example of a second management table according to an embodiment;

DETAILED DESCRIPTION

Figure 1:
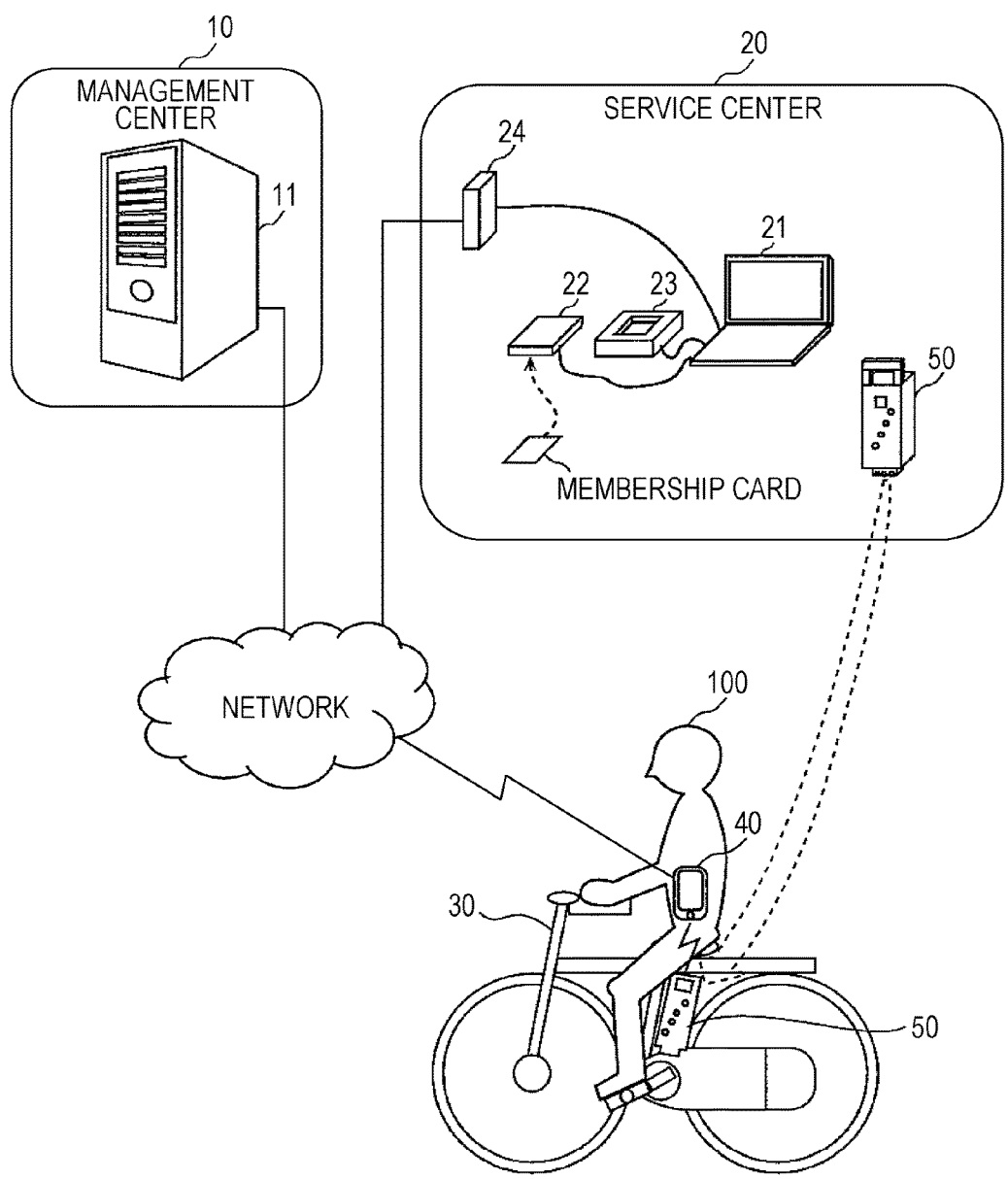
FIG. 1 is a diagram illustrating an overall image of a rental service provided by a rental system according to an embodiment.

A server device according to one aspect of the present disclosure includes: a storage unit that stores points that a user of the battery pack holds, the points being usable as fees for at least one of usage of the battery pack and enjoyment of a service; and a control unit that changes the points, based on whether or not a usage state satisfies the usage condition, the usage condition including at least one of a condition for state management of the battery pack and a condition for usage promotion of the battery pack.

According to this configuration, the points can be changed based on whether or not the usage state of the battery pack satisfies a usage condition. The usage condition includes at least one of a condition for state management of the battery pack and a condition for usage promotion of the battery pack. That is to say, the user can be rewarded or penalized by way of points, in accordance with the usage state of the battery pack. Thus, the user can be guided so that the usage state of the battery pack satisfies the usage conditions, or so that occurrence of situations where the usage state of the battery pack does not satisfy usage conditions can be suppressed. Accordingly, inappropriate usage of the battery pack can be suppressed.

For example, the control unit may increase the points when the usage state satisfies the usage condition.

According to this configuration, points can be increased when the usage state of the battery pack satisfies usage condition. That is to say, the user can be rewarded in accordance with the usage state of the battery pack. Consequently, the user can be guided so that the usage state of the battery pack satisfies the usage condition.

For example, the control unit may decrease the points when the usage state does not satisfy the usage condition.

According to this configuration, points can be decreased when the usage state of the battery pack does not satisfy usage condition. That is to say, the user can be penalized in accordance with the usage state of the battery pack. Consequently, occurrence of situations where the usage state of the battery pack does not satisfy the usage condition can be suppressed.

For example, the usage condition may be a condition for state management of the battery pack. Accordingly, the state of the battery pack can be managed, and an occurrence of situation where the state of the battery pack cannot be managed can be suppressed.

For example, the usage condition may include that a return due date for the battery pack does not lapse or the battery pack is returned by the return due date.

According to this configuration, returning the battery pack by the return due date of the battery pack can be used as the usage condition. Accordingly, occurrence of a situation where the battery pack is not returned by the return due date can be suppressed.

For example, the usage condition may include that an update due date of information indicating a state of the battery pack does not lapse or the information indicating the state of the battery pack is transmitted to the server device by the update due date.

According to this configuration, transmitting information indicating the state of the battery pack to the server device by the update due date of the battery pack can be used as the usage condition. Accordingly, occurrence of a situation where information indicating the state of the battery pack is not transmitted by the update due date can be suppressed.

For example, the usage condition may be a condition for usage promotion of the battery pack.

According to this configuration, conditions to promote usage of the battery pack can be used as the usage condition. Accordingly, use of the battery pack can be promoted, and occurrence of a situation where the battery pack is not used can be suppressed.

For example, the usage condition may include that the battery pack is used beyond a recommended usage amount for the battery pack within a predetermined period.

According to this configuration, using the battery pack beyond a recommended usage amount within a predetermined period can be used as the usage condition. Accordingly, occurrence of a situation where the rented battery pack is only used a little can be suppressed. That is to say, usage of the battery pack can be promoted.

For example, the server device may further include a warning unit that warns the user, the control unit controlling the warning unit to warn the user before decreasing the points.

According to this configuration, the user can be warned before the points are decreased. Accordingly, the user can confirm beforehand that the points are going to be decreased.

For example, the server device may further include a first communication unit that wirelessly communicates with an information terminal, the control unit causes the first communication unit to acquire the usage state from the battery pack via the information terminal.

According to this configuration, the usage state of the battery pack can be acquired from the battery pack via the information terminal and first communication unit. That is to say, the server device can acquire the usage state from the battery pack using the communication functions of the information terminal. As a result, acquisition of the usage state from the information terminal can be realized in a more simple manner than a case where the server device receives the usage state from the battery pack without going through the information terminal, and acquisition of the usage state from the battery pack can be realized more easily.

For example, the server device may further include a first communication unit that wirelessly communicates with an information terminal. The control unit causes the first communication unit to transmit the changed points to the information terminal.

According to this configuration, the changed points can be transmitted to the information terminal. Thus, when the points have been changed, the user can confirm the changed points.

For example, the server device may further include a first communication unit that wirelessly communicates with an information terminal. The control unit causes the first communication unit to transmit information indicating that the points has been changed to the information terminal.

According to this configuration, information indicating that the points have been changed can be transmitted to the information terminal. Thus, when the points have been changed, the user can confirm that the points have been changed.

For example, the server device may further include a second communication unit that wirelessly communicates with the battery pack, the control unit causes the second communication unit to acquire the usage state from the battery pack.

According to this configuration, the usage state can be acquired from the battery pack via the second communication unit. That is to say, the server device can acquire the usage state from the battery pack without going through the information terminal. Thus, the server device can acquire the usage state from the battery pack even when the information terminal cannot communicate with the battery pack and/or server device, and acquisition of the usage state from the battery pack can be performed more surely.

It should be noted that general or specific embodiments may be implemented as a system, a method, an integrated circuit, a computer program, a storage medium such as a computer-readable CD-ROM or the like, or any selective combination a system, a method, an integrated circuit, a computer program, and a storage medium.

Embodiment

An embodiment will be described in detail with reference to the drawings. It should be noted that the embodiment is a general or specific exemplification. Values, shapes, materials, components, placements and connection states of components, steps, order of steps, and so forth, in the embodiment are only exemplary, and do not restrict the present disclosure. Components in the following embodiments which are not included in an independent Claim indicating the highest concept are described as being optional components.

Also note that the drawings are schematic diagrams, and are not necessarily created precisely to scale. Configurations in the drawings that are substantially the same are denoted by the same reference numerals. Redundant description may be omitted or simplified.

Overall Image of Rental Service

FIG. 1 is a diagram illustrating the overall image of a rental service provided by a rental system according to the embodiment. A management center 10 manages the rental services of a battery pack 50 to a user 100. The management center 10 has a server device 11. The server device 11 communicates via network with a processing device 21 of a service center 20 that will be described later, and the battery pack 50, and manages data regarding the user 100 and battery pack 50. The server device 11 also realizes a point service (loyalty program) in the rental service for the battery pack 50. The server device 11 is, for example, a cloud server.

At the service center 20, the battery pack 50 is rented to the user 100, and the rented battery pack 50 is returned from the user 100. The service center 20 also inspects the battery pack 50 and charges the battery pack 50. The service center 20 includes a processing device 21, a card reader 22, an inspection device 23, and a relay device 24.

The processing device 21 communicates with the server device 11 of the management center 10 via network, and performs data processing for the rental service. For example, the processing device 21 transmits an identifier of the user 100 and an identifier of the battery pack 50 to the server device 11 when the battery pack 50 is being rented and returned.

The card reader 22 reads out the identifier of the user 100 from a membership card, and outputs to the processing device 21. The membership card and card reader 22 are, for example, an integrated circuit (IC) card and IC card reader.

The membership card stores an identifier for identifying the user 100, who is a member of the rental service. The membership card is issued to the user 100 from the business operator that runs the rental service by the user 100 being registered as a member. Hereinafter, the identifier stored in the membership card will be referred to as "membership ID".

The inspection device 23 acquires the identifier of the battery pack 50 from the battery pack 50, and outputs to the processing device 21. Hereinafter, the identifier of the battery pack 50 will be referred to as "battery pack ID".

The inspection device 23 further inspects the battery pack 50 returned from the user 100, and outputs the inspection results to the processing device 21. The inspection device 23 inspects the discharge capability and charging capability of the battery pack 50, for example.

The relay device 24 relays communication between the processing device 21 and the server device 11. The relay device 24 is a router, for example.

Electric equipment 30 is a load device to which the battery pack 50 can be mounted, and which consumes electric power. Specific examples of the electric equipment 30 include an electric bicycle, electric scooter, electric automobile, and the like. Note that the electric equipment 30 is not restricted to a mode of transportation. The battery pack 50 rented at the service center 20 is mounted to the electric equipment 30. Thus, electric power is supplied from the battery pack 50 to the electric equipment 30.

An information terminal 40 relays communication between the battery pack 50 and the server device 11. An example of the information terminal 40 is a smartphone. The information terminal 40 transfers data received from the battery pack 50 to the server device 11. The information terminal 40 also transfers data received from the server device 11 to the battery pack 50.

The battery pack 50 has a battery (omitted from illustration). The battery 51 is also called a "secondary battery", and is a battery capable of charging/discharging. Examples of the battery include lithium-ion batteries, lithium polymer batteries, and nickel-hydrogen batteries. The battery pack 50 supplies electric power to the electric equipment 30 by discharging, when mounted to the electric equipment 30. The battery pack 50 also stores electric power by being charged when connected to a charger (omitted from illustration).

Configuration of Server Device

Figure 2:
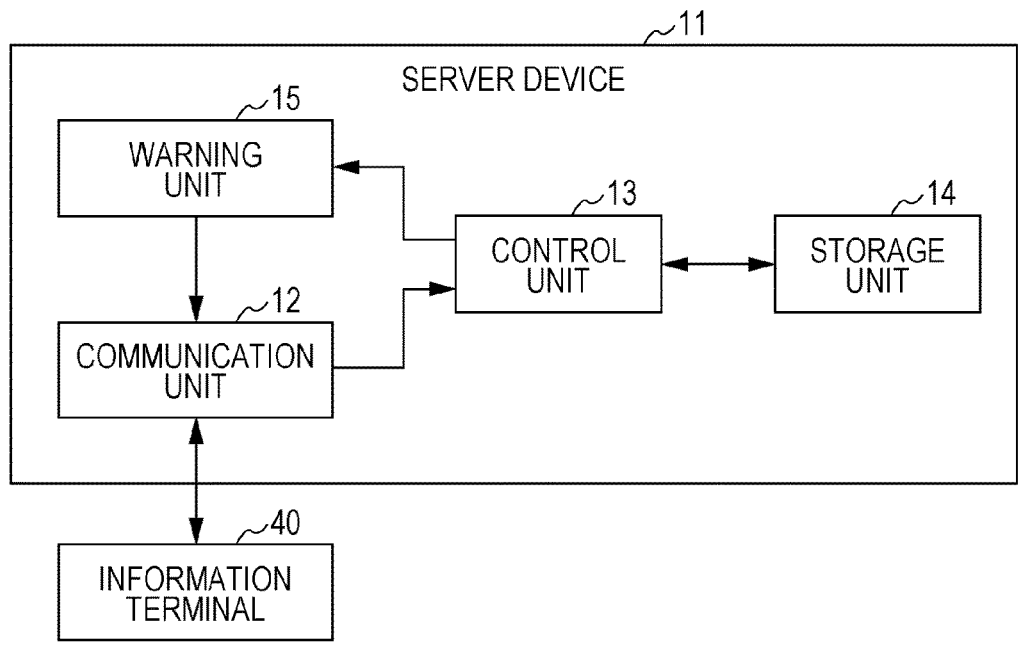
FIG. 2 is a block diagram illustrating the configuration of a server device according to an embodiment.

The configuration of the server device 11 according to the embodiment will be described in detail with reference to FIG. 2. FIG. 2 is a block diagram illustrating the configuration of the server device 11 according to the embodiment. the server device 11 has a communication unit 12, a control unit 13, a storage unit 14, and a warning unit 15.

The communication unit 12 is an example of a first communication unit that wirelessly communicates with the information terminal 40. The communication unit 12 communicates with the information terminal 40 via a mobile communication network, for example. The communication unit 12 acquires information indicating the state of the battery pack 50, for example, from the battery pack 50 via the information terminal 40.

Examples of information indicating the state of the battery pack 50 include the amount of usage of the battery pack 50, the number of times charged, the number of times discharged, learning capacity, usage temperature, and so forth. The state information of the battery pack 50 may also include abnormality history information such as temperature abnormality, electric current abnormality, voltage abnormality, shock abnormality, and so forth. Hereinafter, information indicating the state of the battery pack 50 will be referred to as "state information".

The control unit 13 controls the communication unit 12, storage unit 14, and warning unit 15. The control unit 13 also performs processing for managing the rental server of the battery pack 50 as to the user 100.

Note that the control unit 13 may be realized in any way, as long as control functions are had. For example, the control unit 13 may be configured using dedicated hardware. Alternatively, the control unit 13 may be realized by executing software programs suited for realizing the components. In this case, the control unit 13 may include a computation unit (omitted from illustration) and a storage unit (omitted from illustration) that stores control programs. Examples of the computation unit include a micro processing unit (MPU) and a central processing unit (CPU). An example of the storage unit is memory. Note that the control unit 13 may be configured as an independent control unit that performs centralized control, or as multiple control units that collaborate to perform decentralized control.

The control unit 13 according to the present embodiment manages the points in a point service. Specifically, the control unit 13 changes the points based on whether or not he usage state of the battery pack 50 satisfies usage conditions for usage promotion of the battery pack 50 or usage conditions for state management of the battery pack 50. For example, the control unit 13 increases the points when the usage state satisfies usage conditions. On the other hand, for example, the control unit 13 decreases the points when the usage state does not satisfy usage conditions. Usage conditions will be described in detail later.

Points can be used for at least one of usage fees for the battery pack 50 and services. The services do not have to be restricted to services pertaining to the battery pack 50. For example, the services may be a gift giveaway service, a mileage service for an airline, or the like.

The storage unit 14 is semiconductor memory, a hard disk drive, or the like, for example, and stores data or information. The storage unit 14 according to the present embodiment stores points that the user 100 of the battery pack 50 has.

The warning unit 15 issues warnings to the user 100. For example, the warning unit 15 issues warnings to the user 100 before decreasing points. Specifically, the warning unit 15 issues warnings to the user 100 via the communication unit 12 and information terminal 40. For example, the warning unit 15 generates warning information for the user 100, and transmits this warning information to the information terminal 40 via the communication unit 12.

Processing in Rental System

The processing in the rental system configured as described above will be described in detail with reference to FIGS. 3 through 9.

Rental Processing of Battery Pack

Figure 3:
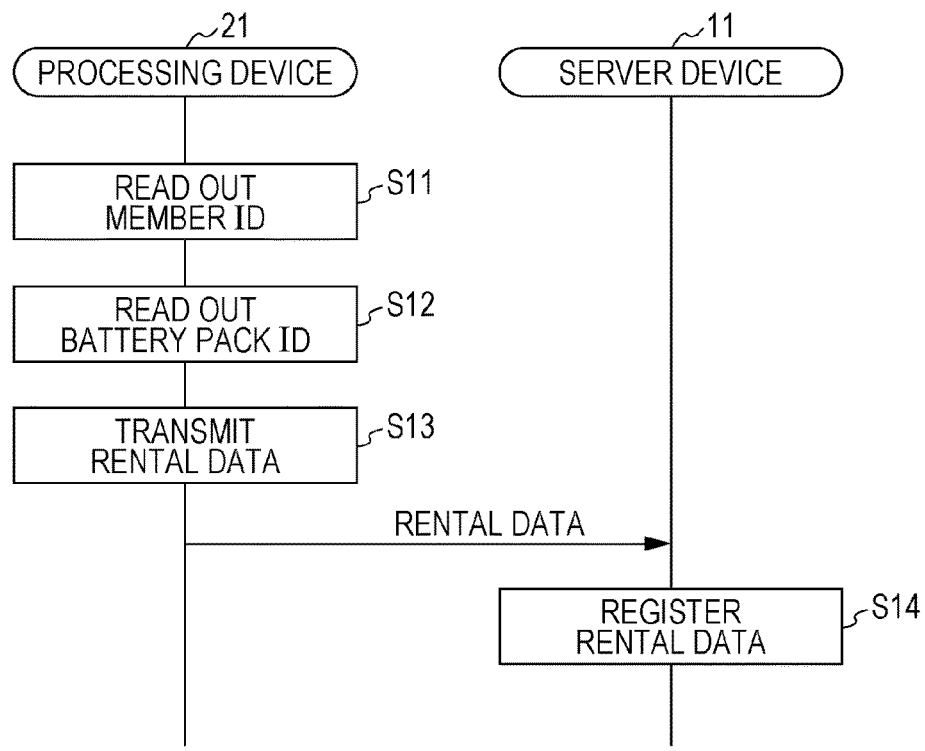
FIG. 3 is a diagram illustrating rental processing of a battery pack in the rental system according to an embodiment.

First, rental processing of the battery pack 50 will be described with reference to FIGS. 3 through 5. FIG. 3 is a diagram illustrating rental processing of the battery pack 50 in the rental system according to the present embodiment.

The user 100 presents a membership card at the service center 20 when using the rental service. The processing device 21 reads the membership ID from the membership card via the card reader 22 (S11). The processing device 21 further reads the battery pack ID from the battery pack 50 to be rented, via the inspection device 23 (S12). The inspection device 23 may inspect the battery pack 50 at this time.

The processing device 21 then transmits rental data to the server device 11 (S13). The rental data includes at least the membership ID and the battery pack ID. The processing device 21 may further transmit point data relating to points that can be used as usage fees for the battery pack 50. Point data includes the membership ID and the number of points to increment in correspondence with this membership ID. The number of points corresponds to a monetary amount paid by the user 100.

The server device 11 receives rental data from the processing device 21, and registers the rental data in a management table (S14). The management table is stored in a storage unit 14 of the server device 11. The storage unit 14 of the server device 11 according to the present embodiment stores a first management table 14a and a second management table 14b.

Examples of the first management table 14a and second management table 14b will be described in detail with reference to FIGS. 4 and 5. FIG. 4 is a diagram illustrating the first management table 14a according to the embodiment. FIG. 5 is a diagram illustrating the second management table 14b according to the embodiment. The first management table 14a includes fields for member ID, battery pack ID, return due date, return date, update due date, and usage amount, as illustrated in FIG. 4.

The member ID and battery pack ID fields have the battery pack ID of the battery pack 50 and the member ID of the user 100 that has rented the battery pack 50 registered in a correlated manner. Each time rental data is received in the present embodiment, a new record is generated in the first management table 14a, with the member ID and battery pack ID included in the rental data being recorded in this record.

The return due data field has registered therein the return due date of the battery pack 50 that has been rented. For example, a return due date based on a rental period is registered in the return due data field at the time of the member ID and battery pack ID being registered. The rental period may be included in the rental data, for example, or may be a predetermined fixed period.

The date on which the rented battery pack 50 was returned is registered in the return date field. No valid data is registered in the return date field if the battery pack 50 has not been returned yet.

The due date on which state information of the battery pack 50 is to be transmitted from the battery pack 50 to the server device 11 is registered in the update due date. The update due date field is updated based on a predetermined update period when the server device 11 has received state information from the battery pack 50, for example.

Registered in the usage amount field is the usage amount of the rented battery pack 50 within a predetermined period. The usage amount is a value that quantitatively expresses the usage of the battery pack 50. The usage amount is, for example, the amount of electric power provided from the battery pack 50 to the electric equipment 30. Note that the usage amount is not restricted to amount of electric power, and may be the number of times charged while the battery pack 50 is rented, for example. This usage amount field is updated based on the usage amount that the sate information indicates with the server device 11 receives the state information from the battery pack 50.

The second management table 14b includes member ID, points, and expiration date fields, as illustrated in FIG. 5.

The member ID and point fields have the member ID of the user 100 and the points usable as usage feeds for the battery pack 50 registered, in a correlated manner. For example, the value in the points field is increased by the number of points in point data when the point data is received.

The expiration date field has registered therein expiration dates of the points. Once the expiration date for points expires, the points become invalid. That is to say, when the expiration date for points passes, the number of points is zero. The expiration date is updated following preset rules.

Transmission Processing of State Information of the Battery Pack

Figure 6:
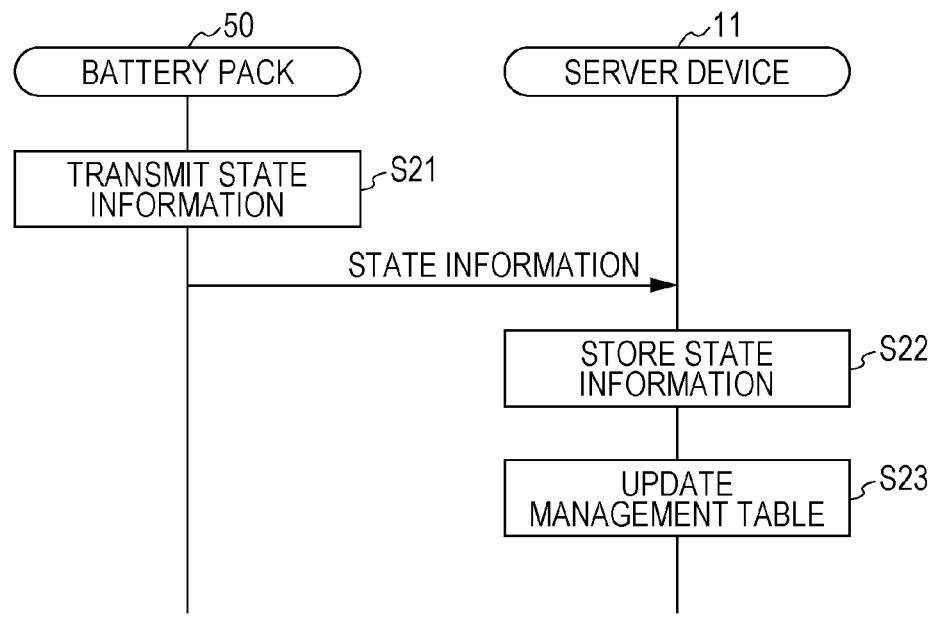
FIG. 6 is a diagram illustrating transmission processing of state information in the rental system according to an embodiment.

Next, transmission processing of state information of the battery pack 50 will be described with reference to FIG. 6. FIG. 6 is a diagram illustrating transmission processing in the rental system according to the embodiment. An arrangement will be assumed here where state information of the battery pack 50 is temporarily stored in a storage unit (omitted from illustration) of the battery pack 50. This transmission processing may be performed at the time of, for example, starting discharging of the battery pack 50, ending discharging, starting charging, ending charging, or the like. Alternatively, the transmission processing may be performed at a predetermined cycle.

First, the battery pack 50 reads out the battery pack ID and state information from the storage unit 56 of the battery pack 50, and transmits the battery pack ID and state information that have been read out to the information terminal 40 (S21). The information terminal 40 transmits the battery pack ID and state information received from the battery pack 50 to the server device 11. Accordingly, the battery pack ID and state information are transmitted from the battery pack 50 to the server device 11. State information here includes at least usage amount.

When server device 11 receives the battery pack ID and state information from the battery pack 50, the server device 11 stores this state information in a manner correlated with this battery pack ID (S22).

The server device 11 then updates the first management table 14a and second management table 14b based on the battery pack ID and state information that have been received (S23). Specifically, the server device 11 updates the usage amount corresponding to the battery pack ID that are included in the first management table 14a, based on the usage amount included in the state information. The server device 11 further identifies the member ID correlated with the battery pack ID that has been received by referencing the first management table 14a. The server device 11 then updates the points corresponding to the identified member ID that are included in the second management table 14b, based on the usage amount included in the state information. Specifically, the server device 11 subtracts points corresponding to the usage amount from the points included in the second management table 14b.

Point Management Processing

Figure 7:
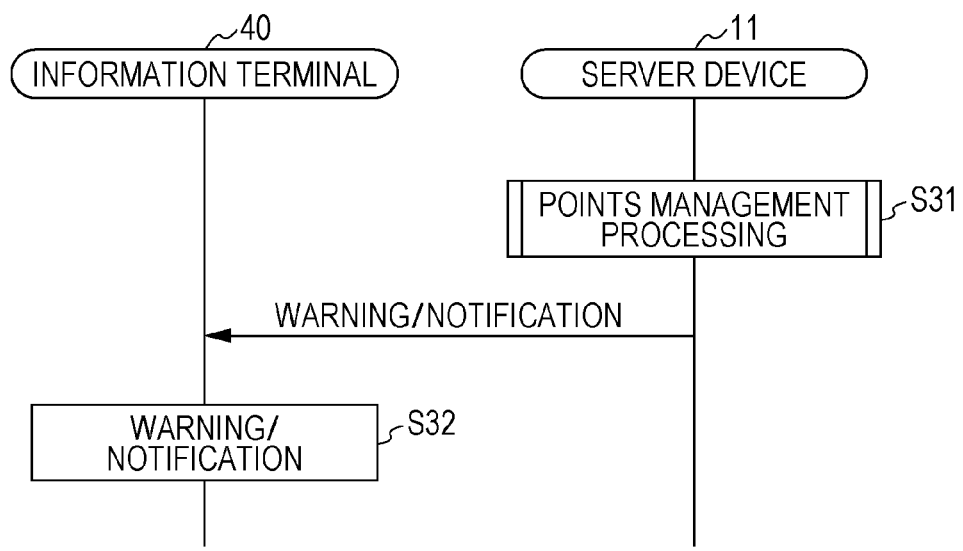
FIG. 7 is a diagram illustrating point management processing in the rental system according to an embodiment.
Figure 8:
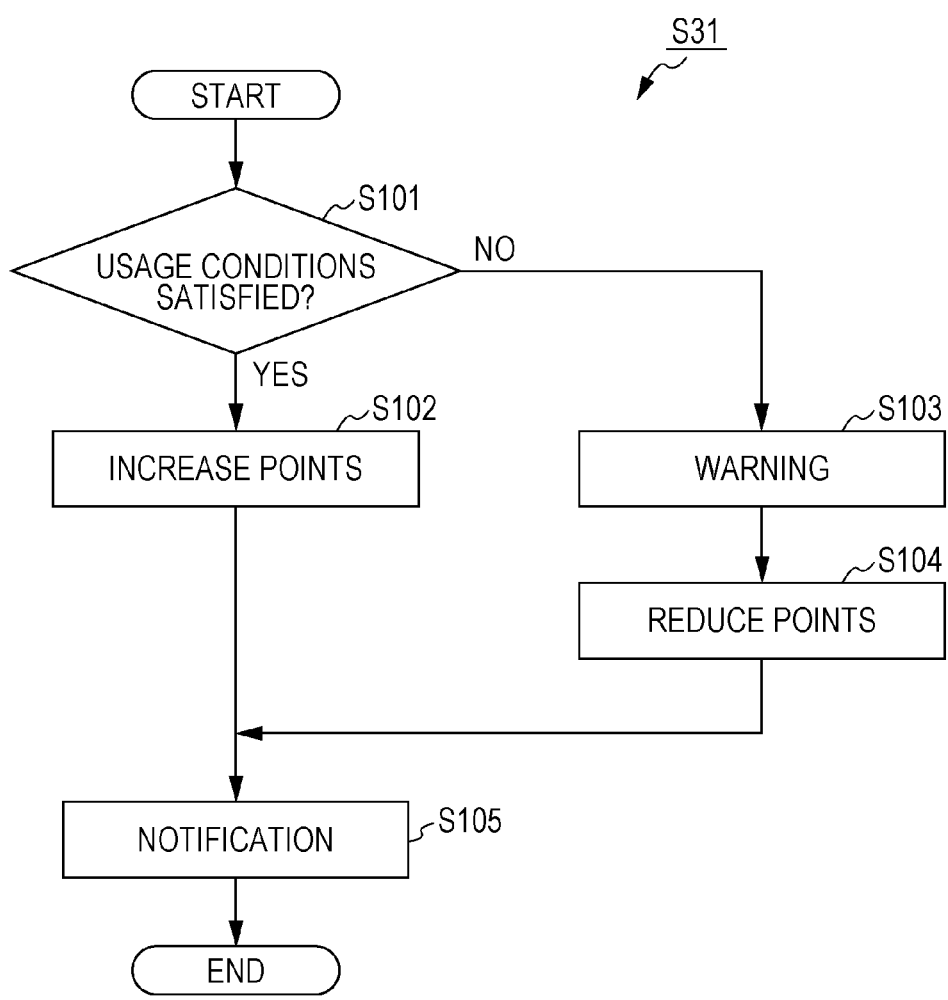
FIG. 8 is a flowchart illustrating point management processing at the server device according to an embodiment.

Next, point management processing will be described with reference to FIGS. 7 and 8. FIG. 7 is a diagram illustrating point management processing in the rental system according to the embodiment. This point management processing may be performed at a predetermined cycle, for example. Alternatively, the point management processing may be performed when state information is received from the battery pack 50.

First, the server device 11 executes point management processing (S31). Warning information or notification information is then transmitted from the server device 11 to the information terminal 40.

Warning information indicates that the usage state of the battery pack 50 does not satisfy the usage conditions. Warning information includes information indicating the usage state and usage conditions, for example.

Notification information is information relating to changes to the points. For example, the notification information indicates that the points have been changed. Alternatively, the notification information may indicate the points after changing. The notification information may also include information indicating the usage state and usage conditions.

When the information terminal 40 receives warning information or notification information from the server device 11, the information terminal 40 gives a warning or notification (S32). For example, the information terminal 40 displays the warning information or notification information on a screen.

Now, the point management processing will be described in detail with reference to FIG. 8. FIG. 8 is a flowchart illustrating point management processing at the server device 11 according to an embodiment.

First, the control unit 13 determines whether or not the usage state of the battery pack 50 satisfies the usage conditions (S101). Usage conditions for promoting usage of the battery pack 50 or usage conditions for state management of the battery pack 50 are used as the usage conditions.

Usage conditions for promoting usage of the battery pack 50 may be to use the battery pack 50 for a recommended usage amount or more within a predetermined period, for example. That is to say, the usage conditions for promoting usage of the battery pack 50 may be that the usage amount of the battery pack 50 within a predetermined period is no less than the recommended usage amount. The predetermined period is a period having a predetermined time span, and is not restricted in particular. The recommended usage amount is a usage amount recommended to promote usage of the battery pack 50.

In this case, if the usage amount of the battery pack 50 that has been rented within the predetermined period is less than the recommended usage amount, determination is made that the usage condition of the battery pack 50 has not been satisfied. Conversely, if the usage amount of the battery pack 50 that has been rented is the recommended usage amount or more, determination is made that the usage state of the battery pack 50 satisfies the usage condition. The state information received from the battery pack 50, for example, is used for determination of the usage condition here. That is to say, the usage state of the battery pack 50 can be acquired from the state information of the battery pack 50.

The usage condition for state management of the battery pack 50 may be that the battery pack 50 is returned by the return due date. That is to say, the usage condition for state management of the battery pack 50 may be that the return due date is kept.

In this case, if the current date is already past the return due date of the battery pack 50 that has been rented, determination is made that the usage condition has not been satisfied. In other words, determination is made that the usage state of the battery pack 50 does not satisfy the usage conditions if the battery pack 50 has not been returned at the point of the return due date of the battery pack 50. Conversely, if the return due date has not yet arrived, determination is made that the usage state of the battery pack 50 satisfies the usage condition. Alternatively, determination may be made that the usage state of the battery pack 50 satisfies the usage condition if the battery pack 50 has been returned before the return due date, i.e., if the return date is earlier than the return due date. The return due date field in the first management table 14a, for example, is referenced for determination of the usage condition here.

The usage condition in the present embodiment for state management of the battery pack 50 may be to transmit the usage state of the battery pack 50 to the server device 11 by the update due date of the battery pack 50, for example. That is to say, the usage condition may be that the update due date for state information of the battery pack 50 is kept.

For example, if the current date is already past the update due date of the battery pack 50 that has been rented, determination is made that the usage condition of the battery pack 50 has not been satisfied. In other words, determination is made that the usage state of the battery pack 50 does not satisfy the usage conditions if information indicating the state of the battery pack 50 has not been transmitted to the server device 11 at the point of the update due date of the battery pack 50. Conversely, if the update due date has not yet arrived, determination is made that the usage state of the battery pack 50 satisfies the usage condition. Alternatively, determination may be made that the usage state of the battery pack 50 satisfies the usage condition if information indicating the state of the battery pack 50 has been transmitted to the server device 11 before the update due date, i.e., if the update date is earlier than the update due date. The update due date field in the first management table 14a, for example, is referenced for determination of the usage condition here.

Note that the update due date is updated when the state information of the battery pack 50 is transmitted to the server device 11. That is to say, the update due date is updated to a new future update due date when the server device 11 receives the state information of the battery pack 50. Accordingly, if state information of the battery pack 50 is transmitted to the server device 11 after determination is made that the usage condition is not satisfied, determination will be made thereafter that the usage condition is satisfied until the current date is after the new update due date.

In a case where the usage state of the battery pack 50 satisfies the usage condition (Yes in S101), the control unit 13 increases the points (S102). For example, the control unit 13 adds predetermined points to the points of the user 100.

More specifically, the control unit 13 references the first management table 14a and identifies the member ID of the user 100 who is renting the battery pack 50 regarding which determination has been made that the usage state of the battery pack 50 satisfies the usage condition. The control unit 13 then references the second management table 14b and acquires the points corresponding to the member ID that has been identified. The control unit 13 adds predetermined points to the points thus acquired. The control unit 13 further updates the points corresponding to the member ID in the second management table 14b to the points as a result of the addition.

On the other hand, in a case where the usage state of the battery pack 50 does not satisfy the usage condition (No in S101), the control unit 13 controls the warning unit 15 to issue a warning to the user 100 (S103). That is to say, the control unit 13 controls the warning unit 15 to issue a warning to the user 100 before decreasing the points. For example, the control unit 13 transmits warning information to the information terminal 40 of the user 100 via the warning unit 15 and the communication unit 12.

Thereafter, the control unit 13 decreases the points (S104). For example, the control unit 13 subtracts predetermined points from the points of the user 100.

More specifically, the control unit 13 references the first management table 14a and identifies the member ID of the user 100 who is renting the battery pack 50 regarding which determination has been made that the usage state of the battery pack 50 does not satisfy the usage condition. The control unit 13 then references the second management table 14b and acquires the points corresponding to the member ID that has been identified. The control unit 13 subtracts predetermined points from the points thus acquired. The control unit 13 further updates the points corresponding to the member ID in the second management table 14b to the points as a result of the subtraction.

Finally, the control unit 13 transmits notification information to the information terminal 40 via the communication unit 12 (S105). Notification information indicates that the points have been changed. Alternatively, the notification information may indicate the points after having been changed. Further, the notification information may indicate both that the points has been changed, and the points after having been changed.

Returning Processing of Battery Pack

Figure 9:
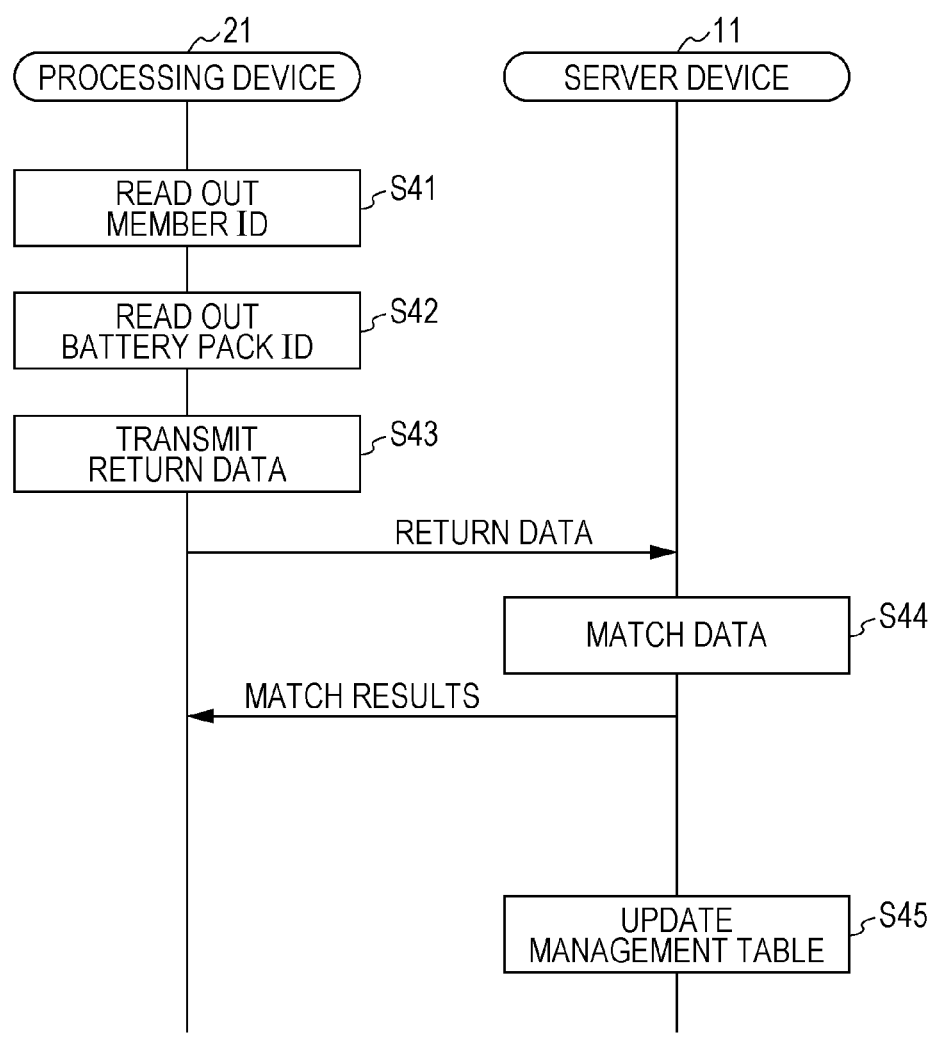
FIG. 9 is a diagram illustrating returning processing of a battery pack in the rental system according to an embodiment.

Next, the processing of returning the battery pack 50 will be described with reference to FIG. 9. FIG. 9 is a diagram illustrating returning processing of a battery pack 50 in the rental system according to the embodiment.

The user 100 presents the membership card at the service center 20 when returning the battery pack 50. The processing device 21 reads out the member ID from the membership card via the card reader 22 (S41). Further, the processing device 21 reads out the battery pack ID from the battery pack 50 being returned, via the inspection device 23 (S42). The inspection device 23 may perform an inspection of the battery pack 50 at this time.

The processing device 21 then transmits return data to the server device 11 (S43). The return data includes at least the member ID and battery pack ID. The return data may further include data relating to the usage amount of the battery pack 50.

The server device 11 receives the return data from the processing device 21, and matches the pair of member ID and battery pack ID included in the return data at the first management table 14a (S44). The match results are transmitted to the processing device 21.

If the match results of the pair of member ID and battery pack ID indicate that matching has been successful, the server device 11 updates the first management table 14a (S45). Specifically, the server device 11 registers the current date in the return date field of the record extracted using the pair of the member ID and battery pack ID.

Advantages

As described above, according to the server device 11 of the present embodiment, the points can be changed based on whether or not the usage state of the battery pack 50 satisfies usage conditions for usage promotion of the battery pack 50 or usage conditions for state management of the battery pack 50. That is to say, the user 100 can be rewarded or penalized by way of points, in accordance with the usage state of the battery pack 50. Thus, the user 100 can be guided so that the usage state of the battery pack 50 satisfies the usage conditions, or so that occurrence of situations where the usage state of the battery pack 50 does not satisfy usage conditions can be suppressed. Accordingly, inappropriate usage of the battery pack 50 can be suppressed.

According to the server device 11 of the present embodiment, points can be increased when the usage state of the battery pack 50 satisfies usage conditions. That is to say, the user 100 can be rewarded in accordance with the usage state of the battery pack 50. Consequently, the user 100 can be guided so that the usage state of the battery pack 50 satisfies the usage conditions.

According to the server device 11 of the present embodiment, points can be decreased when the usage state of the battery pack 50 does not satisfy usage conditions. That is to say, the user 100 can be penalized in accordance with the usage state of the battery pack 50. Consequently, occurrence of situations where the usage state of the battery pack 50 does not satisfy usage conditions can be suppressed.

According to the server device 11 of the present embodiment, returning the battery pack 50 by the return due date of the battery pack 50 can be used as the usage condition. Accordingly, occurrence of a situation where the battery pack 50 is not returned by the return due date can be suppressed.

According to the server device 11 of the present embodiment, transmitting information indicating the state of the battery pack 50 to the server device 11 by the update due date of the battery pack 50 can be used as the usage condition. Accordingly, occurrence of a situation where information indicating the state of the battery pack 50 is not transmitted by the update due date can be suppressed.

According to the server device 11 of the present embodiment, conditions to promote usage of the battery pack 50 can be used as the usage condition. Accordingly, use of the battery pack 50 can be promoted, and occurrence of a situation where the battery pack 50 is not used can be suppressed.

According to the server device 11 of the present embodiment, using the battery pack 50 a recommended usage amount or more within a predetermined period can be used as the usage condition. Accordingly, occurrence of a situation where the rented battery pack 50 is only used a little can be suppressed. That is to say, usage of the battery pack 50 can be promoted.

According to the server device 11 of the present embodiment, the user 100 can be warned before the points are decreased. Accordingly, the user 100 can confirm beforehand that the points are going to be decreased.

According to the server device 11 of the present embodiment, the usage state of the battery pack 50 can be acquired from the battery pack 50 via the information terminal 40 and first communication unit. That is to say, the server device 11 can acquire the usage state from the battery pack 50 using the communication functions of the information terminal 40. As a result, the battery pack 50 can perform communication with a configuration that is simpler than a case where the server device 11 receives information from the battery pack 50 without going through the information terminal 40, and acquisition of the usage state from the battery pack 50 can be realized more easily.

According to the server device 11 of the present embodiment, the points after changing can be transmitted to the information terminal 40. Thus, when the points have been changed, the user 100 can confirm the points after changing.

According to the server device 11 of the present embodiment, information indicating that the points have been changed can be transmitted to the information terminal 40. Thus, when the points have been changed, the user 100 can confirm know that the points have been changed.

OTHER EMBODIMENTS

Although a server device according to one or multiple forms has been described above based on an embodiment, the present disclosure is not restricted to this embodiment.

Modifications of the embodiment conceivable by one skilled in the art may be included in one or multiple forms, without departing from the essence of the present disclosure.

Although the communication unit 12 of the server device 11 has been described in the embodiment as communicating with the information terminal 40, this is not restrictive. For example, the communication unit 12 may be a second communication unit that wirelessly communicates with the battery pack 50. Alternatively, for example, the communication unit 12 may have both a first communication unit that communicates with the information terminal 40 and a second communication unit that wirelessly communicates with the battery pack 50.

According to this configuration, the communication unit 12 of the server device 11 can acquire the usage state from the battery pack 50 without going through the information terminal 40. Accordingly, the server device 11 can acquire the usage state from the battery pack 50 even in a case where the information terminal 40 cannot communicate with the server device 11 and/or the battery pack 50, and can acquire the usage state from the battery pack 50 in a surer manner.

Although description has been made in the above embodiment exemplifying three usage conditions, namely recommended usage amount, return due date, and updating due date, as usage conditions for usage promotion of the battery pack 50 and usage conditions for state management of the battery pack 50, this is not restrictive.

For example, the usage condition may be for the user 100 to have enough or more points, usable as usage fees for the battery pack 50, to cover the points necessary to use the battery pack 50. The points necessary to use the battery pack 50 is a number larger than zero. For example, the points necessary to use the battery pack 50 is the points corresponding to the usage amount in the first management table 14*a*. Alternatively, the points necessary to use the battery pack 50 may be a preset points of which the value is larger than zero.

In this case, if the points the user 100 currently has is less than the points necessary to use the battery pack 50, determination is made that the usage condition of the battery pack 50 is not satisfied. Conversely, if the if the points the user 100 currently has is not less than the points necessary to use the battery pack 50, determination is made that the usage state of the battery pack 50 satisfies the usage condition. The second management table 14*b* is referenced for determination of the usage condition here.

As another example, the usage condition may be for the usage temperature of the battery pack 50 to not exceed a threshold temperature. As yet another example, the usage condition may be for shock abnormality to have not occurred at the battery pack 50. State information received from the battery pack 50 is used for determination of these usage conditions.

Although one usage condition has been described as being used in the above embodiment, multiple usage conditions may be used. In this case, the control unit 13 of the server device 11 can execute the point management processing illustrated in FIG. 8 for each usage condition. The control unit 13 of the server device 11 may also change the points depending on whether or not all of the multiple usage conditions have been satisfied.

Although description has been made in the above embodiment that both increasing and decreasing of the points is performed in accordance with the determination results of the usage conditions, and arrangement may be made where only one of increasing and decreasing of the points is performed. For example, in a case where the number of points is increased when the usage state of the battery pack 50 satisfies the usage conditions, the control unit 13 does not have to decrease the points if the usage state of the battery pack 50 does not satisfy the usage conditions. On the other hand, for example, in a case where the number of points is decreased when the usage state of the battery pack 50 does not satisfy the usage conditions, the control unit 13 of the server device 11 does not have to increase the points if the usage state of the battery pack 50 satisfies the usage conditions.

Note that the configuration of the server device 11 in the above embodiment is exemplary, and is not restricted to the configuration illustrated in FIG. 2. For example, it is sufficient for the server device 11 to have at least the control unit 13 and storage unit 14. In this case, notification and warning does not have to be performed.

The present disclosure is applicable to a server device used in a rental service.

What is claimed is:

1. A management system comprising:
    a memory that stores loyalty points that a user of a battery pack holds, the loyalty points being usable for at least one of usage the battery pack and obtaining a service; and
    a processor configured to change the loyalty points, based on whether or not a usage state of the battery pack satisfies a usage condition, the usage condition including at least one of a condition for state management of the battery pack and a condition for usage promotion of the battery pack,
    wherein the usage condition includes that a return due date for the battery pack does not lapse or the battery pack is returned by the return due date.

2. The management system according to claim 1,
    wherein the processor increases the loyalty points when the usage state satisfies the usage condition.

3. The management system according to claim 1,
    wherein the processor decreases the loyalty points when the usage state does not satisfy the usage condition.

4. The management system according to claim 3, further comprising a transceiver that transmits a warning notification to an information terminal of the user,
    wherein the processor controls the transceiver to transmit the warning notification before decreasing the loyalty points.

5. The management system according to claim 1, further comprising a transceiver that wirelessly communicates with an information terminal,
    wherein the processor causes the transceiver to acquire the usage state from the battery pack via the information terminal.

6. The server device according to claim 1, further comprising a transceiver that wirelessly communicates with an information terminal,
    wherein the processor causes the transceiver to transmit the changed loyalty points to the information terminal.

7. The management system according to claim 1, further comprising a transceiver that wirelessly communicates with an information terminal,
    wherein the processor causes the transceiver to transmit information indicating that the loyalty points has been changed to the information terminal.

8. The management system according to claim 1, further comprising a transceiver that wirelessly communicates with the battery pack,
    wherein the processor causes the transceiver to acquire the usage state from the battery pack.

9. The management system according to claim 1,
wherein the battery pack transmits the usage state directly to the management system.

10. A management system comprising:
a memory that stores loyalty points that a user of a battery pack holds, the loyalty points being usable for at least one of usage the battery pack and obtaining a service; and
a processor configured to change the loyalty points, based on whether or not a usage state of the battery pack satisfies a usage condition, the usage condition including at least one of a condition for state management of the battery pack and a condition for usage promotion of the battery pack,
wherein the usage condition is a condition for usage promotion of the battery pack, and
wherein the usage promotion being based on the usage state of the battery pack.

11. The management system according to claim 10,
wherein the usage condition includes that the battery pack is used beyond a recommended usage amount for the battery pack within a predetermined period.

12. The management system according to claim 10,
wherein the battery pack transmits the usage state directly to the management system.

13. A management system comprising:
a memory that stores loyalty points that a user of a battery pack holds, the loyalty points being usable for at least one of usage the battery pack and obtaining a service; and
a processor configured to change the loyalty points, based on whether or not a usage state of the battery pack satisfies a usage condition, the usage condition including at least one of a condition for state management of the battery pack and a condition for usage promotion of the battery pack,
wherein the usage condition includes that an update due date of information indicating a state of the battery pack does not lapse or the information indicating the state of the battery pack is transmitted to the management system by the update due date, and
wherein the update due date of information include a date on which state information of the battery is registered to be transmitted.

14. The management system according to claim 13,
wherein the battery pack transmits the usage state directly to the management system.

15. A loyalty point management method comprising:
storing, in a memory of a management system, loyalty points that a user of the battery pack holds, the loyalty points being usable for at least one of usage of the battery pack and obtaining a service; and
changing, by a processor of the management system, the loyalty points, based on whether or not a usage state of the battery pack satisfies a usage condition, the usage condition including at least one of condition for state management of the battery pack and a condition for usage promotion of the battery pack,
wherein the usage condition includes that a return due date for the battery pack does not lapse or the battery pack is returned by the return due date.

16. A loyalty point management method comprising:
storing, in a memory of a management system, loyalty points that a user of the battery pack holds, the loyalty points being usable for at least one of usage of the battery pack and obtaining a service; and
changing, by a processor of the management system, the loyalty points, based on whether or not a usage state of the battery pack satisfies a usage condition, the usage condition including at least one of a condition for state management of the battery pack and a condition for usage promotion of the battery pack,
wherein the usage condition includes that an update due date of information indicating a state of the battery pack does not lapse or the information indicating the state of the battery pack is transmitted to the management system by the update due date, and
wherein the update due date of information include a date on which state information of the battery is registered to be transmitted.

17. A loyalty point management method comprising:
storing, in a memory of a management system, loyalty points that a user of the battery pack holds, the loyalty points being usable for at least one of usage of the battery pack and obtaining a service; and
changing, by a processor of the management system, the loyalty points, based on whether or not a usage state of the battery pack satisfies a usage condition, the usage condition including at least one of a condition for state management of the battery pack and a condition for usage promotion of the battery pack,
wherein the usage condition is a condition for usage promotion of the battery pack, and
wherein the usage promotion being based on the usage state of the battery pack.

* * * * *